(12) United States Patent
Cheung et al.

(10) Patent No.: US 9,474,402 B2
(45) Date of Patent: Oct. 25, 2016

(54) JUICER

(71) Applicant: Huiyang Allan Plastic & Electric Industries Co., Limited, Guangdong Province (CN)

(72) Inventors: Shu Sang Cheung, Guangdong Province (CN); Xianliang Ouyang, Guangdong Province (CN); Gangzhi Liu, Guangdong Province (CN)

(*) Notice: Subject to any disclaimer, the term of this patent is extended or adjusted under 35 U.S.C. 154(b) by 0 days.

(21) Appl. No.: 14/831,864

(22) Filed: Aug. 20, 2015

(65) Prior Publication Data

US 2016/0157656 A1 Jun. 9, 2016

(30) Foreign Application Priority Data

Dec. 3, 2014 (CN) .......................... 2014 2 0746674

(51) Int. Cl.
| | |
|---|---|
| *B02C 15/00* | (2006.01) |
| *B04B 5/10* | (2006.01) |
| *A47J 43/14* | (2006.01) |
| *A47J 19/02* | (2006.01) |
| *A47J 19/06* | (2006.01) |
| *A23N 1/00* | (2006.01) |
| *A47J 43/24* | (2006.01) |

(52) U.S. Cl.
CPC ................ *A47J 19/02* (2013.01); *A47J 19/025* (2013.01); *A47J 19/06* (2013.01); *A23N 1/00* (2013.01); *A47J 43/24* (2013.01)

(58) Field of Classification Search
CPC ......... A23N 1/00; A23N 1/003; A47J 43/24; A47J 19/02; A47J 19/027; A47J 19/022

USPC .................................. 99/513, 495, 501–510
See application file for complete search history.

(56) References Cited

U.S. PATENT DOCUMENTS

| | | | | |
|---|---|---|---|---|
| 6,070,519 | A * | 6/2000 | Sham ....................... | A47J 19/02 99/348 |
| 8,091,473 | B2 * | 1/2012 | Kim ........................ | A47J 19/025 100/117 |
| 2007/0277682 | A1 * | 12/2007 | Wong ..................... | A47J 19/025 99/495 |
| 2009/0064875 | A1 * | 3/2009 | Trovinger ................ | A23N 1/02 99/492 |
| 2012/0325946 | A1 * | 12/2012 | Charles ................... | A47J 19/06 241/79 |
| 2014/0053741 | A1 * | 2/2014 | Chou ...................... | A47J 19/06 99/513 |

\* cited by examiner

*Primary Examiner* — Dana Ross
*Assistant Examiner* — Hemant Mathew
(74) *Attorney, Agent, or Firm* — Prakash Nama; Global IP Services, PLLC

(57) ABSTRACT

A juicer having a body, a container, and an upper cover; a propelling screw, a cutting tool, a mesh filter and a rotary brush are arranged in the container. Between the container and the body, output connectors are arranged including a high speed output connector and a low speed output connector, on the high speed output connector a high speed output shaft is arranged; on the low speed output connector a low speed output shaft is arranged. The cutting tool is connected with the high-speed output connector through the high speed output shaft, and the propelling screw is connected with the low speed output connector through the low speed output shaft. The cutting tool is connected with the high-speed output connector through the high speed output shaft, and the propelling screw is connected with the low speed output connector through the low speed output shaft.

7 Claims, 4 Drawing Sheets

JUICER

BACKGROUND OF THE INVENTION

The invention relates to household kitchenware, and in particular to a juicer.

At present, there are two main types of household juicers, one of which is a high speed centrifugal juicer, which rotates at a high speed to throw out the juice with centrifugal force, but this juicer produces a large vibration and noise during the high speed operation, and fruits and vegetables can be oxidized easily during friction and cutting with the high speed cutter, which affects the taste of juice. The other is the screw extrusion type slow juicer, which uses the extrusion by the screw structure to squeeze the juice, and the speed of squeezing juice is low, and in general it is required to cut the fruit into dices and then put them into the feeding tube, and such an operation is inconvenient. It requires a large extrusion pressure because fruits or vegetables are fed and extruded in the form of dices, and the large extrusion pressure in turn should be provided by a powerful motor and gear box, thereby leading to a heavier machine body and higher costs.

BRIEF SUMMARY OF THE INVENTION

In order to solve the above technical problems the invention provides a juicer which has solved the technical problems of complex construction and the ease of use of the prior juicers.

The technical problems of the invention can be solved through the following technical solution: a juicer, including: a body for providing the power in which a deceleration component is arranged; a container for performing the juicing process on which an upper cover is arranged for covering the container, in the container a spiral propelling screw, a cutting tool and a mesh filter are arranged, the cutting tool is mounted on the top of the propelling screw comprising a cutter-disk and cutters or saw-tooth cutters arranged on the upper surface of the cutter-disk, the cutter-disk is conical-shaped, the cutters or saw-tooth cutters are distributed in a spiral form on the cuter-disk, and between every two blades or saw-tooth cutters, a spiral groove is arranged, the cutter-disk speed is reduced, and the mesh filter surrounds the outside of propelling screw, between the container and the body, connectors are arranged including a high speed output connector and a low speed output connector, a high speed output shaft is arranged on the high speed output connector, and a low speed output shaft is arranged on the low speed output connector, the cutting tool is connected with the high speed output connector through the high speed output shaft, the propelling screw is connected with the low speed output connector through the low speed output shaft.

Wherein said high speed output shaft, low speed output shaft and propelling screw are coaxial, the low speed output shaft surrounds the outside of the high speed output shaft, and located within the propelling screw.

Preferably, a feeding tube extends over said upper cover, the diameter of the feeding tube is high and the inner diameter of the feeding tube is greater than 75 mm, and in the feeding tube a pusher is arranged which fits with the feeding tube, and the upper cover and feeding tube form a one-piece structure.

Wherein the cutter-disk is detachable.

Wherein on the surface of the propelling screw spiral convex-shaped ridges are arranged.

Preferably, between the inner wall of the container and the mesh filter, a rotary brush is arranged for cleaning the mesh filter.

More preferably, on the lower part of the container a residue outlet and a juice outlet are arranged.

The cutting tool is connected with the high speed output connector through the high speed output shaft, and the propelling screw is connected with the low speed output connector through the low speed output shaft, so that the high speed rotating of the cutting tool is combined with the slow speed extrusion of the propelling screw, thereby realizing a high speed juicing and a high juice yield. Because the diameter of the feeding tube is large, fruits and vegetables can be put into the feeding tube directly, without the need to be cut into small pieces before juicing, so that the operation of juice extraction is simple and easy to use. The rotation of the rotary brush arranged in the periphery of the mesh filter can prevent the mesh filter from being blocked by residue, which improves the juice yield. The grooves of the cutter-disk enable the fruits and vegetables to move quickly from the cutter-disk into the propelling screw, which can shorten the time of juice squeezing and reduce the waste of juice. The method of the invention is simple, and easy to operate, the whole structure is light and convenient, and juice can maintain a good taste.

DETAILED DESCRIPTION OF THE INVENTION

Figure 1:
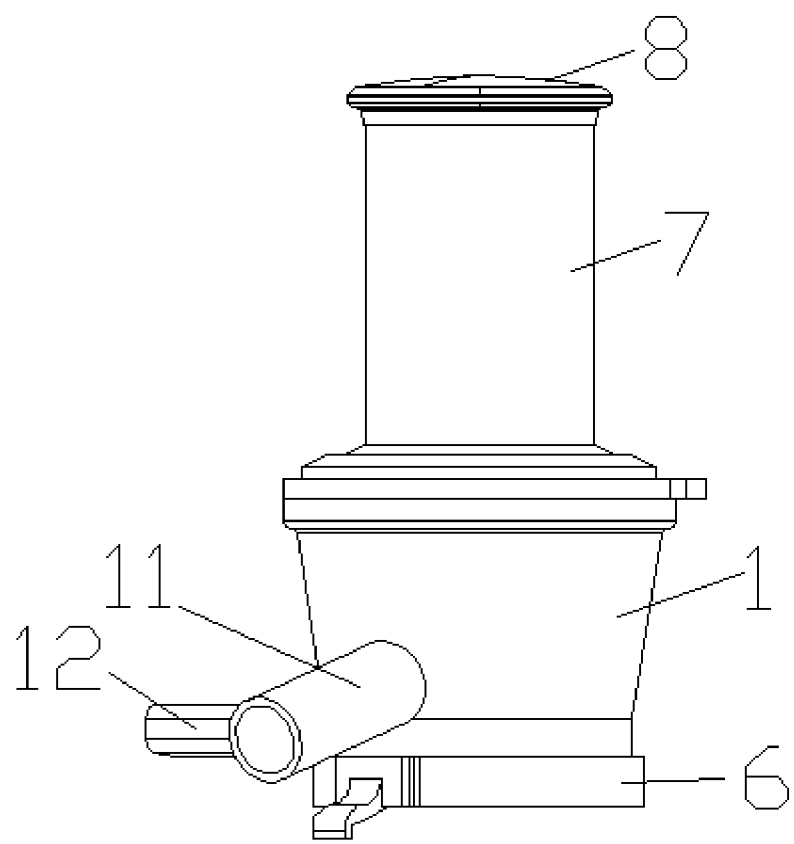
FIG. 1 is an overall structural view of the invention.
Figure 2:
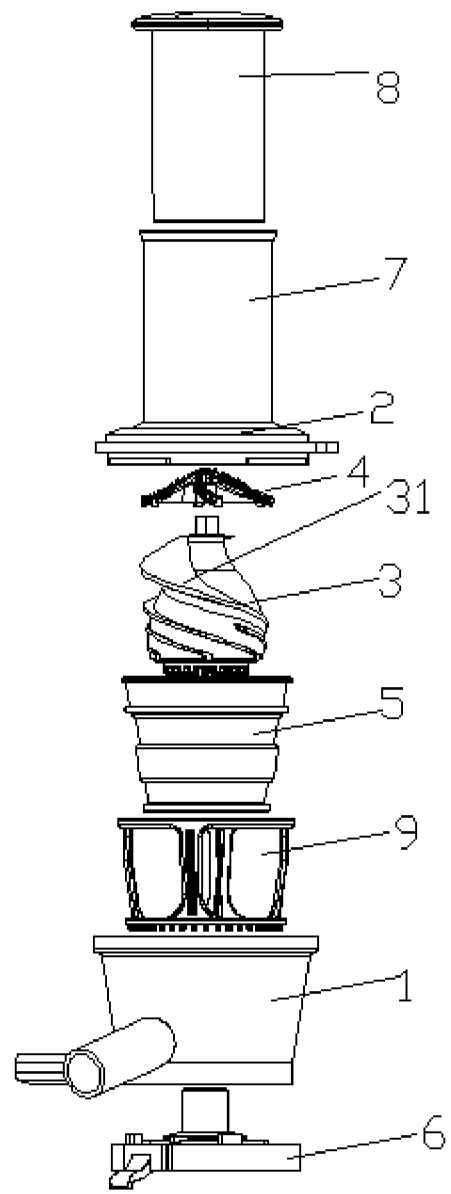
FIG. 2 is an overall exploded view of the invention.
Figure 3:
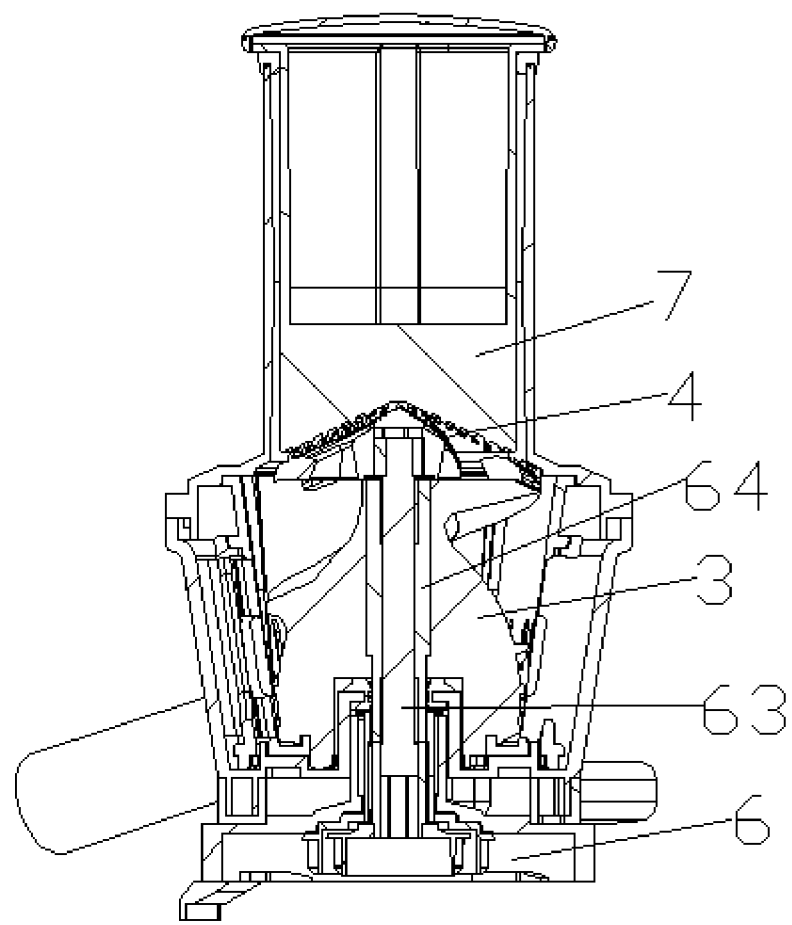
FIG. 3 is an overall cross-section view of the invention.
Figure 4:
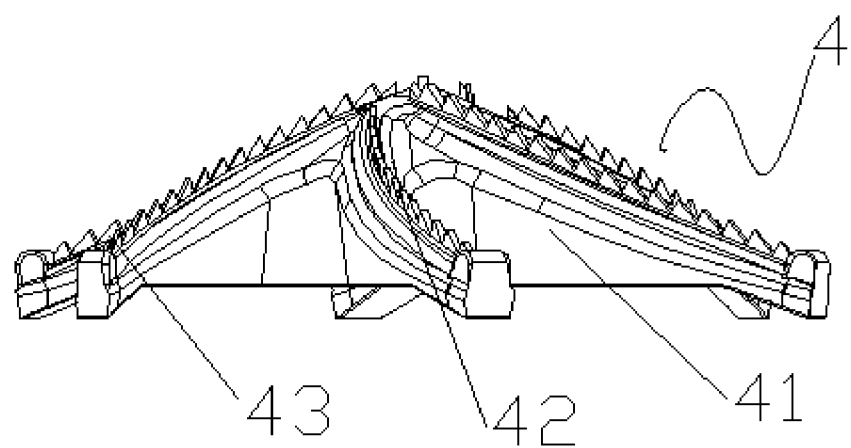
FIG. 4 is a schematic view of the cutter tool according to a first embodiment.
Figure 5:
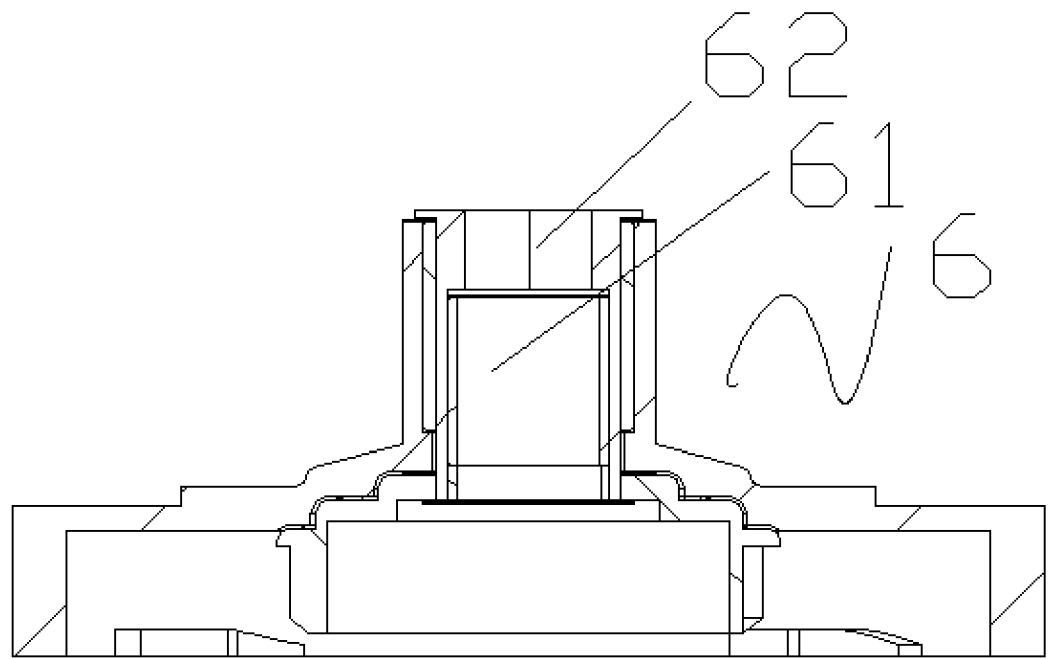
FIG. 5 is a schematic cross-section view of the connectors of the invention.
Figure 6:
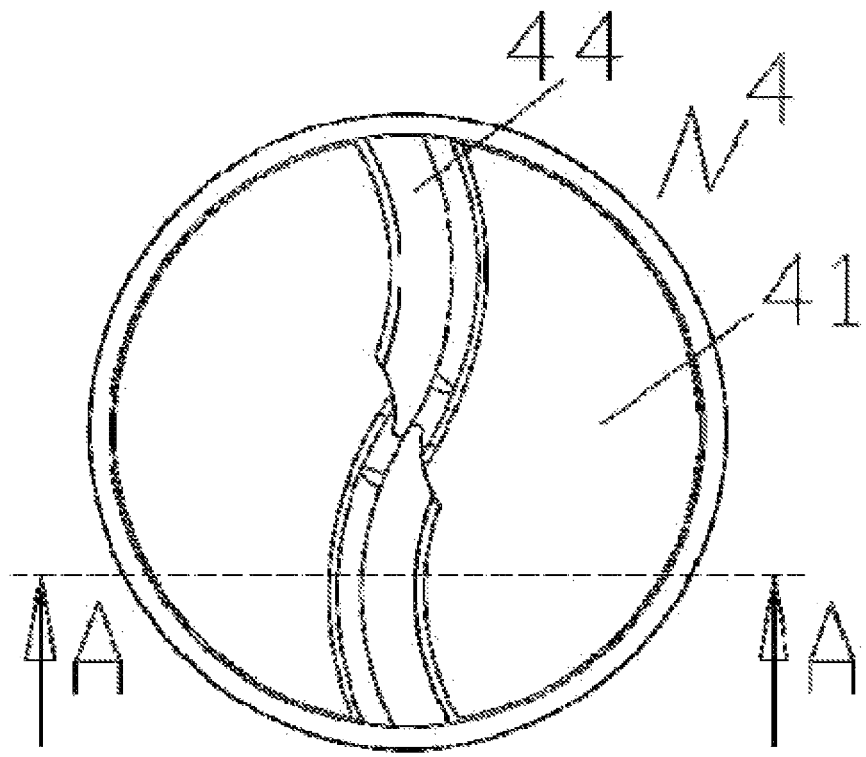
FIG. 6 is a schematic view of the cutter tool according to a second embodiment.

For a better understanding of the technical solution of the invention for those skilled in the art, the structure and principle of the invention are further described with reference to the attached drawings and embodiments.

A juicer comprises a body for providing power, and a deceleration component and a motor are arranged in the body; the juicer further comprises a container 1 for performing the juicing process, and a residue outlet 11 and a juice outlet 12 are arranged in the lower part of the container, and an upper cover 2 is arranged on the container 1 for covering the container. A feeding tube 7 extends over the upper cover, the diameter of the feeding tube is large, and the inner diameter is more than 75 mm; in the feeding tube a pusher 8 is arranged which fits with the feeding tube; the upper cover is of one-piece structure with the feeding tube. In the container, there is a propelling screw 3, a cutting tool 4 and a mesh filter 5 arranged, the cutting tool 4 is mounted on the top of the propelling screw 3, and the mesh filter 5 mantles the external part of the propelling screw 3.

The cutting tool 4 includes a cutter disk 41 and cutters 44 or saw-tooth cutters 42 located on the surface of cutter disk, the cutter-disk 41 is conical, the cutters 44 or saw-tooth cutters on the cutter disk are distributed in a spiral form, a spiral groove 43 is arranged between every two cutters or two saw-tooth cutters. With the spiral grooves, the food that is sliced or cut up can more easily enter into the propelling screw 3. On the surface of the propelling screw 3, a spiral convex-shaped ridge 31 is arranged that is suitable for the mesh filter 5 to squeeze the fruits and vegetables. Besides, the cutter disk is detachable and a different disk is optional, and it reduces heat and oxidation because of a low speed.

Connectors 6 are arranged between the body and the container 1, the connectors 6 include a high speed output connector 61 and a low speed output connector 62, and a high speed output shaft 63 is arranged on the high speed output connector 61 and a low speed output shaft 64 is arranged on the low speed output connector 62; the cutters 4 are connected with the high speed output connector 61 via the high speed output shaft 63, and the propelling screw 3 is connected with the low speed output connector 62 via the low speed output shaft 64. The high speed output shaft 63, the low speed output shaft 64 and the propelling screw 3 are coaxial, the low speed output shaft surrounds the external part of the high speed output shaft and is arranged within the propelling screw. Between the inner wall of the container and the mesh filter, a rotary brush 9 is arranged for cleaning the mesh filter, the rotary bush 9 is connected to the low speed output shaft 64, the rotation of the rotary brush 9 can speed up the discharge of the filter residue on the mesh filter 5, thus hindering the filter residue from blocking the mesh filter 5, and thereby guaranteeing the progress of the juicing.

The detailed juicing process of the invention is as follows: the fruits and vegetables are putted into the feeding tube, then pushed downwards with the pusher, after being sliced or cut up by the cutting tool, the fruits or vegetables enter the spiral propelling screw smoothly, and then extruded between the spiral convex-shaped ridges and the mesh filter. Because the food is processed by the cutting tool 4 at first, compared with the traditional screw extrusion juicer, it has the advantages of a high speed and a high juice yield.

In operation, cutting tool rotates at a high speed, the fruits and vegetables can be better sliced or cut up; because the motor power is slowed down through the deceleration components, the low speed output shaft on the deceleration components outputs at a low speed, so that both the rotary brush and the propelling screw connected with the low speed output shaft rotate at a low speed and better extrude the food that has been sliced or chopped; after being filtering by the mesh filter, the obtained juice flows to the juice outlet on the lower part of the container, while the residue is discharged from the residue outlet. The rotating directions of the high speed output shaft and the low speed output shaft can be the same or the opposite, that is, the rotating direction of the cutting tool and the propelling screw can be the same or the opposite.

The cutting tool of the present invention is connected with the high speed output connector via the high speed output shaft, and the propelling screw is connected with the low speed output connector via the low speed output shaft, so that the high speed rotating of the cutting tool is combined with the slow speed extrusion of the propelling screw, thereby realizing a high speed juicing and a high juice yield. Because the diameter of the feeding tube is large, fruits and vegetables can be put into the feeding tube directly, without the need to be cut into small pieces before juicing, the operation of squeezing juice is simple and easy to use. The rotation of the rotary brush arranged in the periphery of the mesh filter can prevent the mesh filter from being blocked by residue, thus improving the juice yield. The grooves of the cutter-disk enable the fruits and vegetables to move quickly from the cutter-disk into the propelling screw, which can shorten the time of squeezing juice and reducing the waste of juice. The method of the invention is simple, and easy to operate, the whole structure is light and convenient, and juice can maintain a good taste.

The above are the preferred embodiments of the represent invention, and it should be noted that, without deviating from the spirit and essential of the present invention, a person skilled in the art is able to make various corresponding changes and modifications according to the present invention, but these respective changes and modifications should also fall within the protecting scope of the present invention.

What is claimed is:

1. A juicer comprising: a body for providing power in which a deceleration component is arranged; and a container (1) for performing juicing process on which an upper cover (2) is arranged for covering the container (1), characterized in that, in the container a spiral propelling screw (3), a cutting tool (4) and a mesh filter (5) are arranged, the cutting tool (4) is mounted on a top side of the propelling screw (3); the cutting tool (4) comprises a cutter-disk (41) and cutters (44) or saw-tooth cutters (42) arranged on an upper surface of the cutter-disk (41), the cutter-disk (41) is conical-shaped, the cutters (44) or the saw-tooth cutters (42) are distributed in a spiral form on the cutter-disk, and between every two of the cutters or every two of the saw-tooth cutters, a spiral groove (43) is arranged, the cutter-disk has a reduced speed, and the mesh filter (5) surrounds an outer side of the propelling screw (3), and between the container (1) and the body, connectors (6) are arranged including a high speed output connector (61) and a low speed output connector (62), a high speed output shaft (63) is arranged on the high speed output connector (61), and a low speed output shaft (64) is arranged on the low speed output connector (62), the cutting tool (4) is connected with the high speed output connector (61) through the high speed output shaft (63), and the propelling screw (3) is connected with the low speed output connector (62) through the low speed output shaft (64).

2. The juicer according to claim 1, wherein the high speed output shaft (63), the low speed output shaft (64) and the propelling screw (3) are coaxial, the low speed output shaft surrounds an outer side of the high speed output shaft and is arranged in the propelling screw.

3. The juicer according to claim 2, wherein a feeding tube (7) extends above the upper cover (2), a diameter of the feeding tube is high, an inner diameter of the feeding tube is more than 75 mm, in the feeding tube a pusher (8) is arranged that fits with the feeding tube, the upper cover (2) and the feeding tube are of a one-piece structure.

4. The juicer according to claim 3, wherein the cutter-disk (41) is detachable.

5. The juicer according to claim 4, wherein on a surface of the propelling screw (3), spiral convex-shaped ridges (31) are arranged.

6. The juicer according to claim 1, wherein a rotary brush (9) for cleaning the mesh filter is mounted between an inner wall of the container and the mesh filter.

7. The juicer of claim 6, wherein on a lower part of the container (1), a residue outlet (11) and a juice outlet (12) are arranged.

* * * * *